(12) United States Patent
Topp et al.

(10) Patent No.: US 6,821,632 B2
(45) Date of Patent: Nov. 23, 2004

(54) COMPOSITE OF A VULCANIZABLE RUBBER COMPOSITION AND CURED RUBBER PRODUCT

(75) Inventors: Andreas Topp, Hannover (DE); Bernd Kaiser, Hannover (DE); Richard Michalitsch, Vienna (AT); Francis Garnier, Champigny (FR); Philippe Lang, Vincennes (FR)

(73) Assignee: Continental Aktiengesellschaft, Hannover (DE)

( * ) Notice: Subject to any disclaimer, the term of this patent is extended or adjusted under 35 U.S.C. 154(b) by 182 days.

(21) Appl. No.: 09/834,420

(22) Filed: Apr. 13, 2001

(65) Prior Publication Data

US 2002/0061409 A1 May 23, 2002

Related U.S. Application Data

(63) Continuation of application No. PCT/EP99/02904, filed on Apr. 22, 1999.

(51) Int. Cl.$^7$ ............................................... B26B 15/08
(52) U.S. Cl. ..................... 428/461; 428/462; 428/465; 427/208.4; 427/208.8; 427/340; 525/256; 525/259; 525/262
(58) Field of Search .............................. 427/340, 208.4, 427/208.8; 428/461, 462, 465; 525/256, 259, 262

(56) References Cited

U.S. PATENT DOCUMENTS 3,793,130 A  2/1974  Marzocchi
3,857,726 A  12/1974  Van Gils
5,300,569 A  * 4/1994  Drake et al. .................. 525/78
6,087,519 A  7/2000  Garnier et al.

FOREIGN PATENT DOCUMENTS

| DE | 30 27 277 | 2/1981 |
|---|---|---|
| EP | 0 098 434 | 1/1984 |
| EP | 0 182 116 | 5/1986 |
| FR | 2 271 036 | 12/1975 |
| FR | 2 320 974 | 3/1977 |
| WO | WO 97/17144 | 5/1997 |

OTHER PUBLICATIONS

Patent Abstracts of Japan, vol. 008, No. 037, Publication No. 58193134 dated Nov. 10, 1983, "Adhering Process of Steel Cord and Rubber".

* cited by examiner

Primary Examiner—Robert D. Harlan
(74) Attorney, Agent, or Firm—Husch & Eppenberger, LLC; Robert E. Muir; Robert C. Haldiman

(57) ABSTRACT

In a composite of vulcanizable rubber or rubber-like composition with one or more metal reinforcement elements embedded therein, the metal reinforcement element is coated with a polymer or non-cured rubber composition compatible with and co-polymerizable, co-vulcanizable or crosslinkable with said vulcanizable ruber composition to be reinforced, and additionally bearing functional groups either covalently bonding to the metal surface of said reinforcement element or forming covalent bonds with the outward directed first functional groups of a mono- or multimolecular layer of a bifunctional adhesion promoter intercalated between said metal and said coating and bound to said metal by its second functional groups. A cured rubber or rubber-like product, for instance a pneumatic tire, is obtained by vulcanization of such a composite.

36 Claims, 1 Drawing Sheet

COMPOSITE OF A VULCANIZABLE RUBBER COMPOSITION AND CURED RUBBER PRODUCT

APPLICATION CROSS-REFERENCE

This application is a continuation of PCT Application No. PCT/EP99/02904 filed 22 Apr. 1999 and which named the United States as a designated country. PCT Application PCT/EP99/02904 was published on 27 Apr. 2000 as Publication No. WO 00/23504 and claims priority of prior International Application No. PCT/BE98/00153 filed on 15 Oct. 1998.

FIELD OF THE INVENTION

The present invention relates generally to the field of metal-elastomer composites and the problem of reinforcement of polymers, elastomers and especially rubbers with metal elements such as elongated steel elements. More particularly the present invention relates to a composite of a vulcanizable rubber or rubber-like composition with one or more metal reinforcement elements embedded therein, and a cured rubber or rubber-like product obtained by vulcanization of said composite.

BACKGROUND OF THE INVENTION

Among the known composites of metal and elastomers, those wherein reinforcing elements of steel or steel alloys are bonded to rubber find a most wide application in a variety of products including conveyor belts, heavy duty hoses, pulley belts and pneumatic tires.

In today's tire technology, metal reinforcements are coated with a brass layer that undergoes a chemical reaction during curing with a sulfur curable rubber composition, leading to a surface layer predominantly consisting of a copper sulfide layer. This copper sulfide layer facilitates adhesion by mechanical and/or chemical interaction with the cured rubber. Rubber compositions of adhesion rubbers in today's technology have to be fine tuned to support the very specific chemical requirements of adhesion layer formation, and the curing system has to be adjusted to the delicate kinetics of copper sulfide formation in order to reach the optimum balance between size and structure of the copper sulfide dendrons. Rubber compositions that are fine tuned for a variety of uses, such as skim compounds in tires, are high cost materials due to their necessity for a large amount of insoluble sulfur and expensive adhesion promoters like cobalt containing chemicals. Furthermore, compounding for adhesion rubbers is currently a compromise between the demands of the adhesion system and other demands like the resistance against aging phenomena, corrosion, fatigue and durability under the high shear forces acting in tires that are in service.

Numerous adhesion systems have been proposed, where organic adhesives are interposed between the metal and the elastomer or plastic material to create an improved metal-to-elastomer/plastic bond. WO 97/17144 A1, for example, teaches a composition suitable for treating metal surfaces prior to bonding them to other materials, including other metals, rubber, glass, polymers, sealants, and coatings, to enhance bond strength and to prolong useful life in corrosive environments. The composition comprising an organoalkoxysilane is capable of crosslinking when applied to the metal surface to form an adherent coating and is also capable of bonding, via functional groups, with the material to be bonded to the metal surface to form a strong adherent bond.

In particular, for materials under high stress in service, the use of a thin organic adhesive layer alone may not suffice because there is still the problem of adhesion loss caused by high dynamic loads and shear forces acting across the interface between the rigid surface of the metal with the adhesive and the polymer matrix.

Patent abstracts of Japan vol. 8, no 37, JP 58193134A disclose the process of coating a steel cord with liquid rubber, bearing COOH or OH functional groups, and vulcanizing said coated cord embedded in a type of rubber. According to this process, the steel cord is first transferred into a liquid rubber bath containing preferably a liquid polyisoprene rubber with an average viscosity molecular weight of 15000–50000. Although the liquid rubber is of comparatively low molecular weight, the viscosity of the liquid rubber bath is too high to create thin coating layers. This leads to weak boundary layers with the embedding rubber.

FR 2320974 A discloses a coating for a steel reinforcement element of a first layer of an organosilane and a second layer of an organic RFL adhesive, i.e. an aqueous emulsion of a resorcinol-formaldehyd resin and a rubber-containing latex, which is cured thereafter. This product can be used as a reinforcement element for rubber products. However, the curing of the RFL adhesive makes it impossible to get a smooth boundary layer between the coating and the rubber. Moreover, the non-reactive rubber-latex is only held mechanically within the structure of the crosslinked resin and cannot contribute to the bonding between the coating layer and the rubber to be reinforced.

FR 2271036 A discloses a coating for a steel reinforcement element of a first layer of a vinyl polymer comprising OH- and/or COOH-groups and a second layer of a composition of an organic RFL adhesive and a styrene-butadiene vinyl pyridine terpolymer, where both layers are finally heat treated. The same drawbacks as described for FR 2320974 A arise for the coating disclosed in Fr 2271036.

It is therefore an object of the invention to provide an adhesion promoting system between a metal surface and an elastomer that allows for superior resistance against aging, corrosion, dynamic loads and shear forces acting across the interface.

SUMMARY OF THE INVENTION

The aforementioned object of the invention is achieved by a special adhesion promoting coating of the metal, i.e. by a composite of a vulcanizable rubber or rubber-type composition with one or more metal reinforcement elements embedded therein, the metal reinforcement element being coated with a polymer or non-cured rubber composition deposited from an aqueous, alcoholic or organic solution and compatible with and co-polymerizable, co-vulcanizable or crosslinkable with said vulcanizable rubber or rubber-type composition to be reinforced, and additionally bearing functional groups either covalently bonding to the metal surface of said reinforcement element or forming covalent bonds with the outward directed first functional groups of a mono- or multimolecular layer of a bifunctional adhesion promoter intercalated between said metal and said coating and bound to said metal by its second functional groups;

as well as a cured rubber or rubber-like product obtained by vulcanization of the above composite. This product can be, for example, a pneumatic tire, a hose or a belt, such as a conveyor belt or a pulley belt.

BRIEF DESCRIPTION OF THE DRAWING

Reference is now made more particularly to the drawing which illustrates the best presently known mode of carrying out the invention and wherein similar reference to characters indicate the same parts throughout the views.

DETAILED DESCRIPTION

Figure 1:
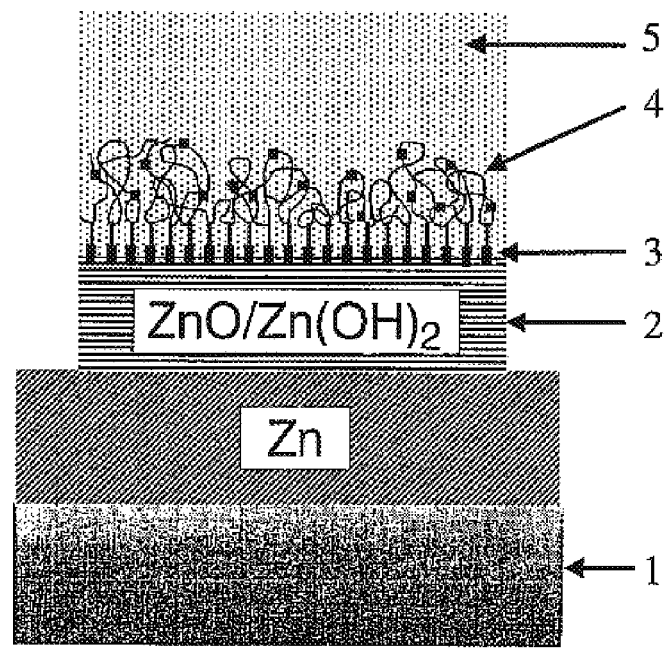
FIG. 1 is a sketch of the novel interface according to the invention.

An important aspect of the present invention is that the functionalized non-cured elastomer or polymer composition of the coating forms durable bonds to both the bare or coated metal surface and the vulcanizable elastomer to be reinforced, despite the different properties of these materials. For the latter purpose, the functionalized non-cured elastomer composition or polymer is co-polymerized, co-vulcanized or crosslinked with said polymeric or elastomeric material to be reinforced. As a result, the module jump between the metal and the vulcanized rubber, elastomer or polymer is minimized in a way especially suited for superior resistance against dynamic loads and shear forces acting across the interface.

The intercalated adhesion promoter layer, if present, provides superior protection to the metal surface against corrosion and makes it possible to use functionalized polymers or prepolymers that ordinarily could not be directly bound to the metal surface. To meet these requirements, the polymer is functionalized to an extent that provides for the formation of a diffuse boundary layer at the interface to the elastomer composition prior and/or during vulcanization. Preferably the functionalization is between 10% and 60%.

A sketch of the novel interface according to the invention is shown in FIG. 1.

The composite according to the invention may further comprise a skim composition on top of said coating a layer for the vulcanizable rubber or rubber-like composition to be reinforced. The rubber composition may advantageously be based on a synthetic or natural poly(isoprene) or poly (butadiene), a styrene-butadiene-rubber (SBR), a halobutylrubber, or an ethylene-propylene-diene-rubber (EPDR).

The coated metal reinforcement element according to the invention can preferably be an elongated steel element.

For the reinforcement of elastomers such as tires, conveyor belts, hoses or timing belts, the steel elements may be comprised of single steel filaments or steel wires, also called monofilaments, or as strips or ribbons. These monofilaments are coated according to the methods of the invention to provide the coated metal reinforcement elements of the invention. The elements may also be used as a set of steel filaments according to the invention which are assembled, bundled, braided, twisted or woven to form a more complex steel structure such as a cord or as a woven steel fabric. On top of an assembled structure of this kind, an additional layer of the polymeric or nun-cured elastomeric composition to be reinforced may be deposited. In other cases, and in particular in the case of pneumatic tires, the adhesion promoter may be deposited directly to the assembled steel cord without prior coating of the filaments.

The coated filaments need not have a circular cross-section and may also take the form of a rectangular, flat or elliptical form.

The diameter of the individual steel filaments is defined as the greatest cross-sectional dimension of the steel filament. This diameter preferably ranges from 0.04 mm for reinforcement of timing belts to 2.0 mm for reinforcement of the bead area of tires.

The steel composition preferably comprises: a carbon content between 0.60% and 1.15%, a manganese content between 0.30% and 0.70%, a silicon content between 0.10% and 0.60%, a maximum sulfur content of 0.05%, and a maximum phosphorus content of 0.05%. Micro-alloying with particular elements such as chromium, nickel, vanadium, boron, cobalt, copper and molybdenum is acceptable for amounts ranging from 0.01% to 0.08% and is preferred if high tensile strengths are to be obtained.

The steel wires or steel filaments can be metal coated. Conveniently they are coated with one or more metallic layers such as brass (63.5–67.5% Cu+36.5–32.5% Zn) or bronze (Cu+Zn+max. 3% Sn). However, in the context of the present invention, coating layers of zinc or zinc alloy are preferred. Examples of suitable zinc alloy layers are:

zinc-aluminium alloys such as those comprising 2 to 12% Al+a mischmetal such as cerium or lanthanum, the remainder being zinc;

zinc-cobalt alloys such as those comprising 0.1% to 50% Co, e.g. 0.1% to 3% Co, the remainder being zinc;

zinc-nickel alloys such as those comprising 20 to 80% Ni, the remainder being zinc;

zinc-iron alloys such as those comprising 0.3 to 1.5% Fe or those comprising 15 to 25% Fe, the remainder being zinc.

Another suitable coating layer according to the present invention may be formed by tin (Sn) or by a tin zinc alloy.

The tensile strength of the steel wires or steel filaments ranges from 1500 Mpa (1500 N/mm$^2$) to over 4000 Mpa and is mainly dependent upon the final diameter, the exact composition (amount of carbon+amount of micro-alloying components) and on the amount of final drawing reduction. These parameters can be fine-tuned by the skilled practitioner in the field.

The polymer backbone of the coating is preferably the same or similar to the material to be reinforced. It is advantageous to select a functionalized polymer that forms a diffuse interface with the polymeric compound. Preferably, both are non-cured rubber compositions, especially synthetic or natural poly(isoprene) or poly(butadiene). Besides the so called rubber elastomers, rubber-like elastomers can also be used. The compositions may comprise common additives such as vulcanization promoters, accelerators, curing systems and so on.

Thermoplastics, thermoplastic elastomers, and elastomers, common thermoplastic polymers such as a thermoplastic polyolefin, olefinic rubber, polyurethane or blends thereof, an elastomeric polymer or copolymer or an at least partially elastomeric block copolymer, such as styrene butadiene rubber, butylrubber, acrylonitrile butadiene rubber, ethylene propylene dien copolymer, ethylene propylene copolymer, natural rubber, synthetic poly(isoprene) and chloroprene rubber can be used as possible matrix polymers or polymeric backbones for the coating.

According to the invention the polymer, or the non-cured rubber composition is functionalized in a way to form strong and durable covalent bonds upon reaction with the metal surface. The metal surface may be pretreated to be partially oxidized.

The functional groups (X) of the functionalized polymer composition, if bound directly to the metal surface, include thiol groups, mercapto groups, silanes, mono-, di- or tri-alkoxysilanes, the alkyl being methyl, ethyl, propyl, or especially:

—SH; —SiHCl$_2$; —SiH$_2$Cl; —Si(Cl)$_3$; —SiHBr$_2$; —SiH$_2$Br; —SiBr$_3$; —Si(R'(Cl)$_2$); —Si(OR')$_3$; —Si(R' (OR')$_2$); —COOH; —COCl;

—PO₃H₂, —SO₂H, their acid anhydride and their acid chloride groups;

an organometallic group of the formula —M(OR')n or —M(Cl), whereby M is a metal selected from the group comprising Al, Sn, B, Ti and V, n being the ligand number corresponding to the metal M;

a phthalocyanin or a phthalonitril group;

a monothiol or a monothiolate group;

and R being alkyl, namely methyl, ethyl or propyl (branched or unbranched).

In the event the functionalized polymer or elastomer, respectively, is not bound directly to the metal surface, but through a bifunctional adhesion promoter intercalated between said metal and said coating, the functional groups of the functionalized polymer react with the outward directed first functional groups (Y) of the bifunctional adhesion promoter to form covalent bonds and the second functional groups (X) of the adhesion promoter react on the metal surface with the metal itself or an oxide or hydroxide thereof.

The functional groups (X) of the adhesion promoter can preferably be as cited above.

The functional groups (Y) of the adhesion promoter can preferably be

Y:NH₂, NHR', or NR'₂, or an unsaturated residue, especially an unsaturated terminal double or triple carbon—carbon bond;

an acrylic or methycrylic acid group and methyl or ethyl esters;

—CN; an activated carboxylic ester; an aldehyde group; an epoxide group;

—SH; —SiHCl₂; —SiH₂Cl; —Si(Cl)₃; —SiHBr₂; —SiH₂Br; —SiBr₃; —Si(R'(Cl)₂); —Si(OR')₃; —Si(R' (OR')₂); —COOH; —COCl; or a functional group capable of forming a complex with at least one ingredient of the polymer matrix or polymer backbone of the coating. This ingredient may be found as a pigment, or may have been added to the nonmetallic medium specifically so as to allow the formation of a complex with constituent part Y. Y may also be —Si—ONa.

If the functionalized polymer or elastomer, respectively, is not bound directly to the metal surface, but is bound through the bifunctional intercalated adhesion promoter, the functional groups of the functionalized polymer can preferably be the following:

thiol groups, mercapto groups, silanes, amines,

—SH; —SiHCl₂; —SiH₂Cl; —Si(Cl)₃; —SiHBr₂; —SiH₂Br; —SiBr₃; —Si(R'(Cl)₂); —Si(OR')₃; —Si(R' (OR')₂); —COOH; —COCl;

—PO₃H2, —SO₂H, their acid anhydride and their acid chloride groups, a phthalocyanin or phthalonitril groups, a monothiol or monothiolate groups; with R' being alkyl, namely methyl, ethyl or propyl (branched or unbranched), all these groups either as terminal groups or carried along the polymer backbone or as part of side chains. The functional groups of the functionalized polymer can also be epoxy groups carried along the polymer backbone (like epoxidized natural rubber, an example is given below), as well as epoxy groups that are part of side chains attached to the polymer backbone (—CH₂—CH₂—COC_{(epoxy)}—CH₃). Amines can be attached in a similar fashion via side groups.

It is important to notice that there may be a choice as to which partner carries which functional group, the functionalized polymer of the coating or the additional adhesion promoter. The list of possible combinations between X and Y groups includes:amine-epoxy, epoxy-silane, epoxy-acidic moieties, clorides, and other.

The adhesion promoter optionally used for improved corrosion protection is a bifunctional compound of the general formula (I)

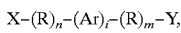

with

X:—SH; —SiHCl₂; —SiH₂Cl; —Si(Cl)₃; —SiHBr₂; —SiH₂Br; —SiBr₃; —Si(R'(Cl)₂); —Si(OR')₃; —Si(R' (OR')₂); —COOH; —COCl;

—PO₃H2, —SO₂H, their acid anhydride and their acid chloride groups, an organometallic group of the formula —M(OR')ₙ or —M(Cl)ₙ, whereby M is a metal selected from the group comprising Al, Sn, B, Ti and V, n being the ligand number corresponding to the metal M;

a phthalocyanin or a phthalonitril group;

a monothiol or a monothiolate group;

and R' being alkyl, namely methyl, ethyl or propyl (branched or unbranched),

R:—CH₂—; a—(CH₂)-chain, whereby 2≦n <20 and whereby said chain may be unhalogenated, partially halogenated or perhalogenated and may contain aromatic or thiophen units, and whereby the chain and/or the units may comprise substituents selected from the group comprising:—(CH₂)ᵢCH₃ with 0≦i≦5, —O(CH₂)ⱼCH₃, or —O(CF₂)ⱼCH₃ with 0≦j≦4, —CN and —NH₂; —CF₂—; —CH₂—CO—NH—CH₂—; —CF₂—CO—NH—CF₂—; —CH₂—CO—NH—CF₂—; CF₂—CO—NH—CH₂— and 0≦n,m≦16, Y:NH₂, NHR', or NR'₂, or an unsaturated residue, especially an unsaturated terminal double or triple carbon—carbon bond; an acrylic or methycrylic acid group and methyl or ethyl esters;

—CN; an activated carboxylic ester; an aldehyde group; an epoxide group;

—SH; —SiHCl₂; —SiH₂Cl; —Si(Cl)₃; —SiHBr₂; —SiH₂Br; —SiBr₃; —Si(R'(Cl)₂); —Si(OR')₃; —Si(R' (OR')₂); —COOH; —COCl; or a functional group capable of forming a complex with at least one ingredient of the non-metallic medium.

AR:an aromatic and/or heteroaromatic system, optionally substituted, for example, according to the above cited list of substituents.

These types of adhesion promoters are generally known as such, e.g. from the EP 0 802 217 A2 which is incorporated herein by reference.

The coated metal reinforcement element may bear an additional layer of the polymeric or non-cured elastomeric composition to be reinforced on top of said coating. This is a vulcanizable rubber composition if the product to be reinforced is a rubber product.

The coated metal reinforcement elements may also be assembled to form an assembled structure like a cord or a belt. In that case the assembled structure may comprise an additional layer of the polymeric or non-cured elastomeric composition to be reinforced on top of said assembled structure.

A suited method for coating a metal surface, especially of a coated metal reinforcement element, with an adhesion promoter that is an organosilane or organosiloxane, comprises the preparation of a pretreated solution of the adhesion promoter and dipping or painting said metal surface with said solution. The dipping or painting as such is known in the art and need not be explained here.

The preparation of the organosiloxane is an important step which was found to yield excellent dense coatings of the organosilane adhesion promoter that is intercalated between the metal surface and the polymer matrix of the coating. This results in superior performance in resistance to aging and corrosion of the metal surface.

The pretreatment preferably includes the hydrolyzation of a catalytic amount of the organosiloxane and dilution of this starter solution with diluent, water and the siloxane. Thereby, a partial hydrolyzation of the organosiloxane is achieved.

This solution is diluted with alcohol and immediately after a certain ripening period, applied to the metal surface.

Preferably the organosiloxane is 3-amino-propyl-trimethoxysilane.

The metal surface can be treated to clean and/or at least parially oxidize the surface. Preferably the metal surface is treated with isopropanol (iPrOH), a mixture of isopropanol with water (iPrOH—$H_2O$), or diluted aqueous HCl. It is also possible to treat the surface with KOH or with a carbonate. All these measures can be used alone or in combination with one other.

The method for coating a metal surface, especially of a coated metal reinforcement element, comprises the deposition of an adhesion promoter, especially by use of the pretreated organosiloxane solution, from an aqueous, alcoholic, or organic solvent, or from the bulk material, and the deposition of a functionalized non-cured polymer or prepolymer from an aqueous, alcoholic, or organic solvent, or from the bulk material, in a one step procedure or multi-step procedure.

Surprisingly, the deposition in a one step procedure leads to favorable results. For this purpose a mixture of the two materials as cited above, or a solution of both—the polymer of the coating and the seperate bifunctional adhesion promoter—is applied to the surface.

Alternatively it is also possible to coat the surface in a first step with the bifunctional adhesion promoter, and in a second step with the functionalized polymer.

FIG. 1 shows an example of the novel interface between the metal and the material to be reinforced for both possible cases: the functionalized polymer matrix of the coating is
   a) bonded via an intercalated adhesion promoter to the metal surface,
   b) directly bonded to the metal surface.
a) bonding with intercalated adhesion promoter:

A zinc-coated steelcord 1 with a partially oxidized surface 2 is covered with a dense layer of a bifunctional adhesion promoter 3. The adhesion promoter molecules (for example a silane) are depicted as small blocks. These adhesion promoter molecules are bonded to a layer 4 of a functionalized polymer via the functionalities depicted as short connection lines. The material to be reinforced ("compound") 5 is bordering on the polymer layer 4 of the coating. The squares illustrate the bonds between the polymer of the coating and the compound-polymer, i.e. the co-vulcanization points. A diffuse boundary layer is formed between 4 and 5, which enhances the resistance against dynamic loads and shear forces acting across the interface.
b) direct bonding to the metal This case only differs from a) in that layer 3 is formed of the functional groups of the polymer bonding directly to the (oxidized) metal surface 2. There are no adhesion promoter molecules in between.

The following examples are given below for a better understanding of the embodiments of this invention. It shall be noted that the examples are only of illustrative but not of restrictive nature.

EXAMPLES

The separate bifunctional adhesion promoter of the general formula Y . . . X, being adapted to form a strong adhesion to the (zinc-coated) steel cord surface is referred to as material "A".

The polymer or prepolymer of the coating, compatible with and co-polymerizable, co-vulcanizable or crosslinkable with said polymeric or elastomeric material to be reinforced, is referred to as material "B".

Example 1

Preparation of a partially hydrolyzed solution of the bifinctional silane 3-Aminopropyltrimethoxysilane (I) or 3-Aminopropyltriethoxysilane (II) in Isopropanol as SOLUTION A Step 1: Hydrolysis of a catalytic amount of 3-aminopropyl-trimethoxysilane (I)

For preparing 1–2 liters of polycondensed silane (polysiloxane) solution, ready for use, 300–600 $\mu$l of water are added to 1 ml of compound (I) under stirring. The hydrolysis starts instantaneously. The temperature during the polycondensation might be increased to 65–70° C., in order to obtain a higher degree of condensation.

Step 2: Hydrolysis of the surface active silane

After 2–5 minutes, the viscous fluid obtained from step 1 is diluted with 9–10 ml (or more, depending on the coupling agent) of methanol and 1–2 ml of water. 9 ml of the surface active coupling silane aminopropyltrimethoxysilane are added under intense stirring. The solution becomes ready for use within 5 minutes. The temperature may be chosen between 25 and 60° C. Higher temperatures during the hydrolysis yield better results. Better adhesion was found for dilute solution, containing about 0.5 to 1% of the surface active silane. Thus the obtained volume of the primary solution can be filled up to 1 or even 2 liters with methanol before use. The same procedure can be used for compound (II). In general the procedure can be applied on any silane of the general formula Y—R—Si (—OR')$_3$.

Coating of the metal element with material "A" as prepared via example 1

1. per dipping (0.1–5 seconds), the thickness of the layers is determined by the concentration of the agent solution (volume of liquid adhering on the metal surface)

2. per painting, the less solvent, the better evaporation; filling of pores, thickness shows the same concentration function as under 1.

After the deposition, the methanol is allowed to evaporate under ambient conditions, in order to conserve a maximum of chemical reactivity. Although drying of the surface is a crucial point, no further curing is applied if possible for the production process. If a dry surface is necessary, the layers may be cured at temperatures between 65 and 100° C., but preferably at 65° C. for 10 minutes.

The described general procedures yield dense layers of silanes with a thickness of 200–500 layers in case of dipping (1% solution), 50–200 layers in case of painting.

The resulting multilayer-system can be applied on slightly hydroxylated metal/metaloxide surfaces for adhesion-promotion to rubber, polyurethane, thermoplastics and so on.

Example 2

Solution A

A partially hydrolyzed solution of the bifunctional silane 3-aminopropyltriethoxysilane in isopropanol is prepared according to example 1.

Solution B

For Solution B, a rubber of type ENR—50 was used. ENR—50 is epoxidized natural rubber with a degree of epoxidization of 50%, i.e., on average every second monomer is epoxidized. A 1–2% solution of ENR—50 in toluene is prepared by prolonged stirring under room temperature. Possible gel fractions are removed by filtration.

Steel cord

A steel cord coated by an electzrolytically deposited Zn layer is used in this example.

Dipping

The cord is first dipped in solution A for 1 minute and dried under moderate temperature for 5 minutes. The polymer layer is applied by dipping for 1 minute in solution B. Again the cord is dried under moderate temperature.

Co-vulcanization

A conventional rubber compound was used, consisting of 100 phr NR, 60 phr N326, 5 phr aromatic oil, 2 phr 6PPD, 5 phr ZnO, 1 phr stearic acid, 0.6 phr DCBS, 2.5 phr sulfur. Standard test specimen were prepared and the pull-out force was determined. Values of the pull-out force were comparable to conventional brass technology and good rubber coverage was observed.

The deposition of the polymer cation (material "B") can be accomplished in one step together with an adhesion promoter (material "A"). The following examples n and n+1 are given for the one step procedure.

Example 3

1.) Before film deposition, the zinc-coated steel cord is cleaned by dipping it for 10 seconds in a pure isopropanol solution, iPrOH.

2.) Then the dipping solution consisting of materials "A" and "B" is prepared.

As adhesion promoter, material "A", various silanes or mixtures of silanes can be used. In this example aminopropyltrimethoxy-silane (APS) is used.

A first 10 cm$^3$ aqueous solution of isopropanol, iPrOH—H$_2$O was realized, with iPrOH—H$_2$O proportions of 9:1. APS was added to this solution at 1% volume content. To this solution material "B" was added, in this example surface-modified polybutadiene was used, which is a powder of some 250 um size particles. This product is derived by pulverizing commercial tires and contains varying amounts of polybutadiene-costyrene, polybutadiene, natural rubber, carbon black, petroleum oil, zinc oxides and other additives. 400 mg of this powder is added to the preceding solution of "A". The resulting mixture is a heterogeneous suspension, and is stirred.

The steel cord is then dipped in this "A"+"B" solution during 10 seconds, and then dried 1 minute in an oven at 70° C. The coated steel cord is then ready for use.

Adhesion test results have shown a pull out force of 1023 Newton, with an average surface coverage of 3.6 according to a rating based on visual inspection:1 defining no rubber coverage, 5 defining full thick rubber coverage.

Example 4

The same procedure as with example 3 was applied, but using as material "B" an aqueous suspension of polystyrene latex particles, which have been functionalized with pendent carboxylic functions and are commercially available under the brand name Estapor from Rhone Poulenc. These particles have a precise diameter of 1 $\mu$m, A quantity of 1% in volume of this aqueous solution is added to a solution of "A", which was made by mixing 0.15% in volume of APS to a iPrOH—H$_2$O 9:1 solution. The steel cord was dipped in this "A"+"B" solution, with a dipping time of 10 seconds, followed by a heating, 1 minute at 70° C.

The adhesion tests showed a pull out force of 1190 Newton and an average coverage of 3.5 according to a rating based on visual inspection:1 defining no rubber coverage, 5 defining full thick rubber coverage.

In examples 3 and 4, instead of APS, a mercaptopropyltrialkoxysilane or an aminoprnpyltrialkoxysilane, such as aminopropyltriethoxysilane, can be used.

Example 5

In this example a functionalized polymer is given, that bounds directly to the metal surface via functional groups of type (X). The polymer is triethoxysilyl-poly-1,2-butadiene. This silane is dissolved under reflux in heptane/toluene 10:1. The wire is dipped in a boiling solution, dried during one hour in air followed by a drying step of 15 minutes at 110° C.

Adhesion to various polymer matrices:

1.) Adhesion to natural rubber

The composition of the rubber is: natural rubber:100 parts, carbon black N300:60 parts per hundred rubber (phr), oil:11 phr, zinc oxide:5 phr, stearic acid:1 phr, 6-ppd:1 phr, sulfur:2.5 phr, MBS:0.6 phr.

Adhesion is quantified by the pull out force as per ASTM D2229. The embedded length is 25 mm. The vulcanization temperature was 150° C. and vulcanization time was 20 minutes. The pull out speed is 100 mm/min, and the circle of the pull out clamp is 12.7 mm. Prior art stands for untreated zinc coated steel cord.

|  | Pull out force (Newton) |
| --- | --- |
| Prior art samples | 71 |
|  | 73 |
| Example 5 | 453 |

2.) Adhesion to a conventional hose rubber compound:

|  | Pull out force (Newton) |
| --- | --- |
| Prior art sample | 73 |
| Example 5 | 922 |

Other objects, features and advantages will be apparent to those skilled in the art. While preferred embodiments of the present invention have been illustrated and described, this has been by way of illustration and the invention should not be limited except as required by the scope of the appended claims.

What is claimed is:

1. A composite of a vulcanizable composition selected from a group consisting of natural rubbers, synthetic rubbers and thermoplastic elastomers and having at least one metal reinforcement element embedded therein, wherein the metal reinforcement element has a coating of a polymer deposited from a solution and compatible with and co-polymerizable with said vulcanizable composition, and bearing functional groups covalently bonding to the metal surface of said reinforcement element, wherein the functional groups are:

organometallic groups of the formula —M(Cl')$_n$, wherein M is a metal selected from the group consisting of Al, Sn, B, Ti and V; and n is the number of ligands corresponding to the metal M.

2. A composite according to claim 1, wherein said solution is an aqueous solution.

3. A composite according to claim 1, wherein said solution is an alcoholic solution.

4. A composite according to claim 1, wherein said solution is an organic solution.

5. A composite according to claim 1, wherein said at least one metal reinforcement element has a coating of a non-cured rubber composition.

6. A composite according to claim 1, wherein said at least one metal reinforcement element comprises on top of said coating, a layer of a skim composition for the vulcanizable composition.

7. A composite according to claim 1 wherein the vulcanizable composition to be reinforced is a composition selected from the group consisting of a synthetic poly(isoprene), a natural poly(isoprene), a synthetic poly(butadiene), natural poly(butadiene), a styrene-butadiene-rubber (SBR), a halobutylrubber, and an ethylene-propylene-diene-rubber (EPDM).

8. A composite according to claim 1, wherein said metal reinforcement element is an elongated steel element.

9. A composite according to claim 8, wherein said elongated steel element is coated with at least one metallic layer.

10. A composite according to claim 9, wherein said metallic layer is comprised of a metal selected from the group consisting of brass, bronze, zinc, zinc alloy, tin and tin alloy.

11. A composite according to claim 10, wherein said zinc alloy is an alloy selected from the group consisting of a zinc-aluminium alloy, a zinc-aluminium-mischmetal alloy, a zinc-manganese alloy, a zinc-cobalt alloy, a zinc-nickel alloy, a zinc-iron alloy and a zinc-tin alloy.

12. A composite according to claim 1, wherein said functional groups are carried along a polymer backbone.

13. A composite according to claim 1, wherein said functional groups are part of side chains of the polymer.

14. A composite according to claim 12, wherein said functional groups are epoxy groups carried along the polymer backbone.

15. A composite according to claim 12, wherein said functional groups are epoxy groups which are part of side chains attached to the polymer backbone.

16. A composite of a vulcanizable composition selected from a group consisting of natural rubbers, synthetic rubbers and thermoplastic elastomers and having a least one metal reinforcement element embedded therein, wherein the metal reinforcement element has a coating of a polymer deposited from a solution and compatible with and co-polymerizable with said vulcanizable composition, and bearing functional groups covalently bonding to the metal surface of said at least one reinforcement element, wherein the functional groups are selected from the group consisting of:
  thiol groups;
  silanes, SiHCl$_2$, —SiH$_2$Cl', —Si(Cl)$_3$, SiHBr$_2$, —SiH$_2$Br, —SiBr$_3$, —Si(R'(Cl)$_2$), —Si(OR')$_3$—Si(R'(OR')$_2$), wherein R' is an alkyl selected from the groups consisting of methyl, ethyl, and propyl; amines;
  —PO$_3$H$_2$, —SO$_2$H;
  the acid anhydride group of —PO$_3$H$_2$ and —SO$_2$H; the acid chloride group of —PO$_3$H$_2$ and —SO$_2$H; organometallic groups of the formula —M(OR')$_n$ and —M(Cl')$_n$, wherein M is a metal selected from the group consisting of Al, Sn, B, Ti, and V; and n is the number of ligands corresponding to the metal M;
  phthalocyanin groups; and;
  phthalonitril groups;
  wherein the functional groups are carried as terminal groups, carried along the polymer backbone, or carried as part of side chains, and wherein said polymer is bound to said metal surface by an adhesion promotor that is a bifunctional compound of the general formula (I)

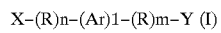

with X representing a group capable of reacting covalently at the metal surface,
R representing an organic spacer chain;
Ar representing an aromatic system,
Y representing a group capable of forming covalent bonds to the functional groups of said coating, and $0 \leq n$, $m \leq 16$, $0 \leq 1 \leq 6$, and $n+m+1 \neq 0$.

17. A composite according to claim 16 wherein
X is a functional group selected from the group consisting of —SH; —SiHCl$_2$; —SiH$_2$Cl; —Si(Cl)$_3$; —SiHBr$_2$; —SiH$_2$Br; —SiBr$_3$; —Si(R'(Cl)$_2$); —Si(OR')$_3$; —Si(R'(OR')$_2$); —COOH; —COCl; —PO$_3$H$_2$, —SO$_2$H; an organometallic group of the formula —M(OR')$_n$, whereby M is a metal selected from the group consisting of Al, Sn, B, Ti and V and n is the ligand number corresponding to the metal M; a phthalocyanin; a phthalonitril group; a monothiol; or a monothiolate group; R' is an alkyl
Y is a functional group selected from the group consisting of NH$_2$; NHR'; NR'$_2$; an unsaturated residue; an acrylic acid group; a methycrylic acid group; methyl esters or ethyl esters; and
R represents —CH$_2$.

18. A composite according to claim 17, wherein R represents a —(CH$_2$)— chain; $2 \leq n \leq 20$; and said chain is unhalogenated, aromatic units, and includes constituents selected from the group consisting of: —(CH$_2$)$_i$CH$_3$ where $0 \leq i \leq 5$, —O(CH$_2$)$_j$CH$_3$, or —O(CF$_2$)$_i$CH$_3$ where $0 \leq j \leq 4$, —CN and —NH$_2$; —CF$_2$—; —CH$_2$—CO—NH—CH$_2$__; —CF$_2$—CO—NH—CF$_2$__; CH$_2$—CO—NH —CF$_2$__;CF$_2$—CO—NH—CH$_2$__and where
  —CN is a functional group selected from the group consisting of an activated carboxylic ester; an aldehyde group; an epoxide group; —SH; —SiHCl$_2$; —SiH$_2$Cl; —Si(Cl)$_3$; —SiHBr$_2$; —SiH$_2$Br; —SiBr$_3$; —Si(R' (Cl)$_2$); —Si(OR')$_3$; —Si(R'(OR')$_2$); —COOH; —COCl; or a functional group capable of forming a complex with at least one ingredient of a non-metallic medium.

19. A composite according to claim 18, wherein said chain may be partially halogenated.

20. A composite according to claim 18, wherein said chain may be perhalogenated.

21. A composite according to claim 18, wherein said chain may contain thiophen units.

22. A composite according to claim 18, wherein said aromatic units may comprise constituents selected from the group consisting of: —(CH$_2$)$_i$CH$_3$ where $0 \leq i \leq 5$, —O(CH$_2$)$_j$CH$_3$, or —O(CF$_2$)$_i$CH$_3$ where $0 \leq j \leq 4$, —CN and —NH$_2$; —CF$_2$__; —CH$_2$__CO—NH—CH$_2$__; —CF$_2$—CO—NH—CF$_2$__; —CH$_2$—CO—NH—CF$_2$__; and CF$_2$—CO—NH—CH$_2$__.

23. A composite according to claim 21, wherein said thiophen units may comprise constituents selected from the group consisting of: —(CH$_2$)$_i$CH$_3$ where $0 \leq i \leq 5$, —O(CH$_2$)$_j$CH$_3$, or —O(CF$_2$)$_i$CH$_3$ where $0 \leq j \leq 4$, —CN and —NH$_2$;

—$CF_2$—; —$CH_2$—CO—NH—$CH_2$—; —$CF_2$—CO—NH—$CF_2$—; —$CH_2$—CO—NH—$CF_2$—; $CF_2$—CO—NH—$CH_2$—.

24. A composite according to claim 17, wherein X is a functional group selected from the group consisting of the acid anhydride group of —COOH; —$PO_3H_2$, and —$SO_2H$.

25. A composite according to claim 17, wherein X is a functional group selected from the group consisting of the acid chloride group of —COOH; —$PO_3H_2$, and —$SO_2H$.

26. A composite according to claim 17, wherein R' is an alkyl selected from the group consisting of methyl, ethyl and propyl.

27. A cured composition obtained by vulcanization of a composite according to claim 1.

28. A composition according to claim 27, wherein said composition is a pneumatic tire.

29. A composition according to claim 27, wherein said composition is a hose.

30. A composition according to claim 27, wherein said composition is a conveyor belt.

31. A composition according to claim 27, wherein said composition is a pulley belt.

32. A cured composition obtained by vulcanization of a composite according to claim 16.

33. A composition according to claim 32, wherein said composition is a pneumatic tire.

34. A composition according to claim 32, wherein said composition is a hose.

35. A composition according to claim 32, wherein said composition is a conveyor belt.

36. A composition according to claim 32, wherein said composition is a pulley belt.

* * * * *